United States Patent
Park et al.

(10) Patent No.: US 12,086,805 B2
(45) Date of Patent: Sep. 10, 2024

(54) USER IDENTITY SHARING SYSTEM USING DISTRIBUTED LEDGER TECHNOLOGY SECURITY PLATFORM FOR VIRTUAL ASSET SERVICE

(71) Applicants: SEOUL UNIVERSITY OF FOREIGN STUDIES INDUSTRY ACADEMY COOPERATION FOUNDATION, Seoul (KR); SOON CHUN HYANG UNIVERSITY INDUSTRY ACADEMY COOPERATION FOUNDATION, Asan-si (KR)

(72) Inventors: Keundug Park, Seoul (KR); Heung Youl Youm, Seoul (KR)

(73) Assignees: SEOUL UNIVERSITY OF FOREIGN STUDIES INDUSTRY ACADEMY COOPERATION FOUNDATION, Seoul (KR); SOON CHUN HYANG UNIVERSITY INDUSTRY ACADEMY COOPERATION FOUNDATION, Chungcheongnam-Do (KR)

( * ) Notice: Subject to any disclaimer, the term of this patent is extended or adjusted under 35 U.S.C. 154(b) by 137 days.

(21) Appl. No.: 17/779,285

(22) PCT Filed: Nov. 28, 2019

(86) PCT No.: PCT/KR2019/016592
§ 371 (c)(1),
(2) Date: May 24, 2022

(87) PCT Pub. No.: WO2021/107195
PCT Pub. Date: Jun. 3, 2021

(65) Prior Publication Data
US 2022/0391901 A1 Dec. 8, 2022

(30) Foreign Application Priority Data
Nov. 28, 2019 (KR) .................. 10-2019-0155417

(51) Int. Cl.
*G06Q 20/00* (2012.01)
*G06Q 20/40* (2012.01)
(52) U.S. Cl.
CPC ....... *G06Q 20/401* (2013.01); *G06Q 2220/00* (2013.01)
(58) Field of Classification Search
None
See application file for complete search history.

(56) References Cited

U.S. PATENT DOCUMENTS 8,799,022 B1 * 8/2014 O'Brien ............... G16H 40/67
 705/2
10,985,910 B2 * 4/2021 Hennebert ............ H04L 9/3247
(Continued)

FOREIGN PATENT DOCUMENTS

CN 109962890 A 7/2019
KR 101528780 B1 6/2015
(Continued)

OTHER PUBLICATIONS

Allessi; A Decentralized Personal Data Store Prototype Based on Ethereum and IPFS; Lecce, Italy; 7 pages; 2018.*
(Continued)

*Primary Examiner* — Radu Andrei
(74) *Attorney, Agent, or Firm* — CANTOR COLBURN LLP (57) ABSTRACT

Disclosed herein is a user identity sharing system utilizing a distributed ledger technology security platform. The present invention includes an OFF-CHAIN configured to operate as a regional or national blockchain within a single jurisdiction, in which one or more virtual asset service providers and one
(Continued)

or more identity management service providers are participating; and an ON-CHAIN configured to operate as a global blockchain with no borders, in which one or more virtual asset service providers are participating, wherein user identity information of the OFF-CHAIN are shared as de-identified identity information between a virtual asset service provider participating in both the OFF-CHAIN and the ON-CHAIN and another virtual asset service provider participating in the ON-CHAIN, thus preventing forgery of user identity information, and sharing user identity information between virtual asset service providers, other blockchains, distributed ledger technology platforms, and existing IT systems.

13 Claims, 5 Drawing Sheets

(56) References Cited

U.S. PATENT DOCUMENTS

| | | | | |
|---|---|---|---|---|
| 11,050,563 | B2* | 6/2021 | Hennebert | H04L 9/3239 |
| 11,164,180 | B1* | 11/2021 | Rhea | H04L 9/0637 |
| 11,392,702 | B2* | 7/2022 | Mugundan | G06F 16/1824 |
| 2002/0073099 | A1* | 6/2002 | Gilbert | G06F 16/30 |
| 2007/0245144 | A1* | 10/2007 | Wilson | G06F 21/6254 |
| | | | | 713/170 |
| 2009/0313170 | A1* | 12/2009 | Goldner | G16H 10/20 |
| | | | | 715/779 |
| 2010/0138370 | A1* | 6/2010 | Wu | H04H 60/33 |
| | | | | 707/769 |
| 2011/0112862 | A1* | 5/2011 | Yu | G06F 16/958 |
| | | | | 707/707 |
| 2011/0112970 | A1* | 5/2011 | Yu | G06Q 40/00 |
| | | | | 705/2 |
| 2012/0205453 | A1* | 8/2012 | Rampersad | G06Q 50/26 |
| | | | | 235/487 |
| 2015/0262248 | A1* | 9/2015 | Chaouki | G06Q 40/03 |
| | | | | 705/14.66 |
| 2016/0292363 | A1* | 10/2016 | Serlie | G06F 16/245 |
| 2017/0017762 | A1* | 1/2017 | Gross | H04L 63/08 |
| 2018/0115426 | A1* | 4/2018 | Andrade | H04L 9/3231 |
| 2018/0294955 | A1* | 10/2018 | Rhie | G06F 16/2272 |
| 2019/0087602 | A1* | 3/2019 | Park | G06F 40/106 |
| 2019/0108498 | A1 | 4/2019 | Deshpande et al. | |
| 2019/0183387 | A1* | 6/2019 | Cosentino | A61B 5/053 |
| 2019/0355057 | A1 | 11/2019 | Phillips et al. | |
| 2019/0372985 | A1* | 12/2019 | Zamora Duran | H04L 63/123 |
| 2020/0099512 | A1* | 3/2020 | Kikinis | H04L 9/3247 |
| 2020/0168033 | A1* | 5/2020 | Mcqueen | G07F 17/3218 |
| 2020/0225643 | A1* | 7/2020 | Tugbo | G05B 19/4183 |
| 2020/0226123 | A1* | 7/2020 | Nixon | G05B 19/4183 |
| 2020/0228342 | A1* | 7/2020 | Nixon | H04L 9/0637 |
| 2021/0067513 | A1* | 3/2021 | Hassani | H04W 12/009 |
| 2022/0012233 | A1* | 1/2022 | Thurau | H04L 63/0428 |
| 2022/0038280 | A1* | 2/2022 | Punal | H04L 9/3239 |

FOREIGN PATENT DOCUMENTS

| | | |
|---|---|---|
| KR | 101922565 B1 | 11/2018 |
| KR | 101936757 B1 | 1/2019 |
| KR | 1020190059491 A | 5/2019 |
| WO | 2018211382 A1 | 11/2018 |

OTHER PUBLICATIONS

Allessi; A Decentralized Personal Data Store Prototype Based on Ethereum and IPFS; Lecce, Italy; 7 p. 2018.*
Brinckman; A Comparative Evaluation of Blockchain Systems for Application Sharing Using Containers; IEEE; pp. 490-497; 2017.*
DeCusatis; Identity-based network security for commercial blockchain services; IEEE, pp. 474-477; 2018.*
Golatowski; Challenges and Research Directions for Blockchains in the Internet of Things; IEEE; pp. 712-717; 2019.*
Goodell; A Decentralised Digital Identity Architecture; University College London; 30 pages; 2019.*
Sangmyung University Industry Academy Cooperation Foundation, A study on Personal Information Protection Issues Using Block Chain in Information and Communication Services, 2018, 172pages (including English translation).
Korean Office Action for Application No. 10-2019-0155417 dated Nov. 28, 2019, citing the above reference(s).
International Search Report for Application No. PCT/KR2019/016592 dated Aug. 28, 2020, citing the above reference(s).
Written Opinion for Application No. PCT/KR2019/016592 dated Aug. 28, 2020, citing the above reference(s).
Extended European Search Report mailed Jun. 26, 2023 in European Patent Application No. 19953977.6, 9 pages.
Zhang et al., "Blockchain based secure data sharing system for Internet of vehicles: A position paper," Vehicular Communications 16 (2019), 9 pages.

\* cited by examiner

USER IDENTITY SHARING SYSTEM USING DISTRIBUTED LEDGER TECHNOLOGY SECURITY PLATFORM FOR VIRTUAL ASSET SERVICE

TECHNICAL FIELD

The present invention relates to an identity sharing system, and more particularly, to a distributed ledger technology-based user identity sharing system for a virtual asset service, capable of receiving identity information of a counterpart in the case of remitting and receiving a virtual asset based on distributed ledger technology.

BACKGROUND ART

Since virtual asset providers (hereinafter referred to as virtual asset service providers) are required to observe anti-money laundering obligations under the ACT ON REPORTING AND USING SPECIFIED FINANCIAL TRANSACTION INFORMATION, virtual asset service providers, including cryptocurrency exchanges, are immediately subject to the laws related to anti-money laundering obligation to perform real-name verification upon cash deposit and withdrawal transactions.

In other words, the virtual asset service providers should verify the identity of an originator and a beneficiary upon the virtual asset transactions, but it is not easy to verify the identity information of the originator and the beneficiary in current blockchain technology and virtual asset service environments.

Figure 1:
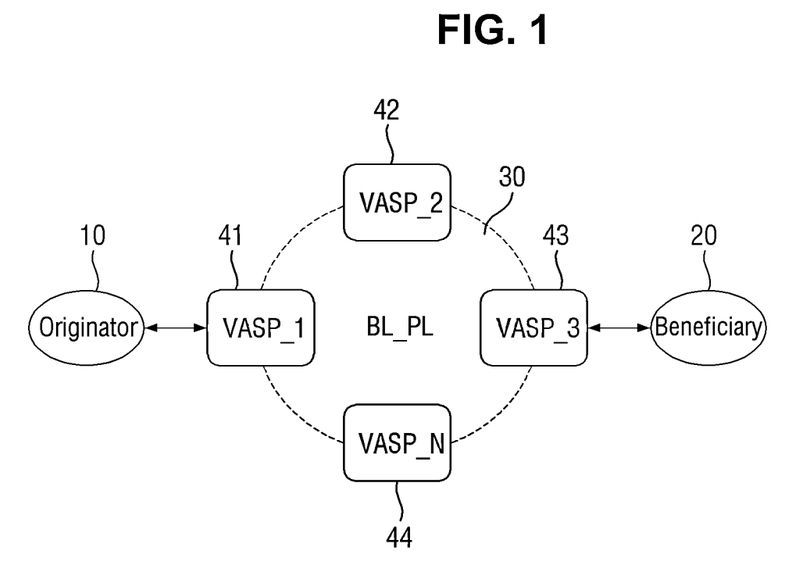
FIG. 1 is a diagram illustrating a conventional blockchain platform.

Referring to a diagram illustrating a conventional blockchain platform of FIG. 1, when an originator (Re) 10 intends to remit to the beneficiary (Rc) 20 in the blockchain platform (BL_PL) 30, the originator (Re) 10 should be provided with the identity information for the beneficiary (Rc) 20 from the virtual asset service provider_1 (VASP_1) 41. However, the virtual asset service provider_1 (VASP_1) 41 cannot receive the information about the beneficiary (Rc) 20 from the virtual asset service provider_3 (VAVA_3) 43.

In addition, the virtual asset service provider_3 (VASP_3) 43 should obtain the identity information for the originator (Re) 10 from the virtual asset service provider_1 (VASP_1) 41 and provide the identity information to the beneficiary (Rc) 20. In this case, the virtual asset service provider_3 (VASP_3) 43 also cannot provide the information because the virtual asset service provider_3 (VASP_3) 43 cannot receive information about the originator (Re) 10 from virtual asset service provider_1 (VASP_1) 41.

Due to this structure, it is impossible to share user identity information among virtual asset service providers, which makes it difficult to verify the real name. Therefore, there is a problem that it is not possible to observe obligations (customer due diligence: CDD) that require identity verification.

SUMMARY OF INVENTION

Technical Problem

In order to solve this problem, the present invention is to provide a user identity sharing system utilizing a distributed ledger technology security platform specialized in virtual asset transactions in which domestic and foreign virtual asset service providers, identity management service providers or the like participate.

In addition, another object of the present invention is to provide a user identity sharing system utilizing a distributed ledger technology security platform for virtual asset services, which allows to register identity information on an ON-chain and an OFF-CHAIN and enables the identity information to be verified on ON-chain, while observing the anti-money laundering obligations related to virtual assets and complying with the Guidance for a Risk-Based Approach to Virtual Assets and Virtual Asset Service Providers by the Financial Action Task Force (FATF) and laws and regulations of each country related to personal information.

In addition, another object of the present invention is to provide a user identity sharing system utilizing a distributed ledger technology security platform for a virtual asset service, capable of processing information according to a predetermined data specification in the case of registering/changing/deleting identity information on an OFF-CHAIN and an ON-CHAIN, and using registered identity information.

Solution to Problem

In order to solve this problem, a user identity sharing system utilizing a distributed ledger technology security platform includes an OFF-CHAIN configured to operate as a regional or national blockchain within a single jurisdiction, in which one or more virtual asset service providers and one or more identity management service providers are participating; and an ON-CHAIN configured to operate as a global blockchain with no borders, in which one or more virtual asset service providers are participating, wherein user identity information of the OFF-CHAIN are shared as de-identified identity information between a virtual asset service provider participating in both the OFF-CHAIN and the ON-CHAIN and another virtual asset service provider participating in the ON-CHAIN.

The virtual asset service provider is characterized in that it participates in the ON-CHAIN and OFF-CHAIN at the same time, and an identity management service provider participates in the OFF-CHAIN.

The virtual asset service provider or the identity management service provider, which participate in the OFF-CHAIN, registers, changes, or deletes the user identity information and shares identity information with other virtual asset service providers participating in the ON-chain.

Advantageous Effects of Invention

Therefore, according to the user identity sharing system utilizing the distributed ledger technology security platform for the virtual asset service of the present invention, it is possible to prevent forgery of the user identity information and share user identity information between the virtual asset service providers, or between other blockchains and distributed ledger technology platforms, existing IT systems, and the like.

In addition, according to the present invention, it is possible to observe the anti-money laundering obligations related to virtual assets and comply with the Guidance for a Risk-Based Approach to Virtual Assets and Virtual Asset Service Providers by the Financial Action Task Force (FATF) and laws and regulations of each country related to personal information through verification and storage of identities of an originator and a beneficiary.

DESCRIPTION OF EMBODIMENTS

The terms or words used in the present specification and claims should not be interpreted as a conventional or dictionary-based meaning for restrictive purposes, and they should be interpreted as meaning and concepts matching with the technical concepts of the present invention based on the principle that the inventors can define the concepts of the terms in the most effective ways for the purpose of describing his invention in the best way.

Throughout the specification, when a part is said to "include" a certain component, it means that it can further include other components without excluding other components unless specifically stated otherwise. In addition, the terms " . . . unit", " . . . er", "module", "device", or the like described in the specification mean a unit that processes at least one function or operation and they can be implemented with hardware or software or a combination thereof.

The term "and/or" throughout the specification should be understood to include all combinations that can be presented from one or more related items. For example, "first item, second item and/or third item" may mean any possible combination of two or more of first, second or third items as well as the first, second or third items.

In each step of the specification, identification symbols (for example, a, b, c, . . . ) are used for convenience of description and the identification symbols do not limit the order of the steps. The steps may be performed in a different order from the described order unless the context clearly indicates a specific order. That is, each step may be performed in the same order as described, substantially simultaneously, or in the reverse order.

First, terms used in the present invention are defined as having the following meanings.

"Virtual Asset" is a representation of digitized values that can be traded or transferred in a digital manner and used for payment or investment purposes, and does not include digital representation of legal tender, securities or other financial assets.

"Virtual Asset Service Provider (hereinafter referred to as VASP)" means a natural person, a legal entity or a company not covered elsewhere in the Recommendation, and may perform one or more of the following activities or operations on behalf of another natural person or legal entity.

i) exchange between virtual assets and monetary currencies, ii) exchange between one or more types of virtual assets, iii) transfer of virtual assets, iv) storage and/or management of virtual asset or a tool that enables the control for virtual asset, and v) an action of participating in and providing financial services related to the issuance and/or sale of virtual assets.

"OFF-CHAIN" is related to the blockchain system but is located outside the blockchain system to operate. Data stored in the OFF-CHAIN is shared only with participating nodes belonging to the same jurisdiction and is recorded outside the blockchain. A transaction includes not only transactions but also several actions.

"On-Chain" means a manner of recording transaction details (data) or the like in a blockchain system, and the data stored in the ON-CHAIN may be shared by all participating nodes.

In addition, since the registration/change/deletion of data and verification of identity information in the ON-CHAIN and the OFF-CHAIN are performed according to the following data specifications, data specifications related to the identity information used in the present invention will be first described.

Table 1 shows an example of a standard data specification used in the present invention.

TABLE 1

| Item | Encryption | Value |
|------|------------|-------|
| D-0  | —          | User number |
| D-1  | Encryption | Country code |
| D-2  | Encryption | Name |
| D-3  | Encryption | Certificate |
| D-4  | Encryption | Digital wallet address |
| D-5  | —          | VASP |
| D-6  | —          | IMSP |
| D-7  | —          | Validation |
| D-8  | —          | RESERVED |
| D-9  | —          | RESERVED |

Referring to Table 1, as a description for set items, the standard data specifications related to the identity information of the present invention are set as 10 items.

First, "D-0" item is an item for setting a user number, and specifically, an item for setting a user number and hash values.

The user number is a unique number assigned to a user, and the hash values are hash values for items "D-1, D-2, and D-3" to be described later.

The "D-1" item is an item in which a country code of a user is set, and may be written with a list of countries on a worldwide database, such as KR when the nationality of the user is Korea or US when the nationality of the user is America.

The "D-2" item is for setting a user name of an individual or a corporation. The "D-3" item is for setting a user's certificate, such as the X.509 standard, and the "D-4" item is for setting a digital wallet address for trading virtual assets. The items D-1, D-2, D-3 and D-4 all are encrypted and stored in all data specifications.

For such encryption, bi-direction encryption is used in the data specification used in the OFF-CHAIN, and uni-direction encryption (e.g., hash value) is used in the data standard used in the ON-CHAIN.

The "D-5" item is for writing the name of a virtual asset service provider (VASP), such as coinbase which manages a user's digital wallet, and "D-6" is for writing the name of an identity management service provider (IMSP), which has authenticated a user's identity. However, the virtual asset service provider (VASP) and the identity management service provider (IMSP) may be identical to each other.

The "D-7" item is for setting the validation of the user's identity, and may include Valid (trading possible), invalid (trading suspended), N/A (not available).

Items "D-8" and "D-9" are reserved for future use.

As described above, the data used in the user identity sharing system using the distributed ledger technology security platform of the present invention includes 10 items as basic items and may be divided into necessary items in which content is to be necessarily written according to required data formats, optional items, and reserved items for use.

Such a standard data specification may use a data specification consisting of items necessary for registering, changing, deleting and using user identity information.

For example, Data specification_1 is an identity_information_providing_data specification and is shown in Table 2 as a data specification when the IMSP or VASP provides the identity information to an OFF-CHAIN.

TABLE 2

| Item | Necessary/Optional | Value |
| --- | --- | --- |
| D-0 | — | RESERVED |
| D-1 | Necessary | Country code |
| D-2 | Necessary | Name |
| D-3 | Necessary | Certificate |
| D-4 | Necessary | Digital wallet address |
| D-5 | Necessary | VASP |
| D-6 | Necessary | IMSP |
| D-7 | Necessary | Validation |

Referring to the data specification_1 of Table 2, the data specification_1 is a data specification used when the IMSP or VASP provides identity information to the OFF-CHAIN. Item "D-0" for a user unique number is reserved, and identity information are written with respect to setting items, such as a country code in the "D-1" item, a user name in the "D-2" item, user's certificate in the "D-3" item, a digital wallet address in the "D-4" item, a virtual asset service provider in the "D-5" item, an identity management service provider in the "D-6" item, and the validation in "D-7" item, and the like.

Of course, the country code in the "D-1" item, the user name in the "D-2" item, the user's certificate in the "D-3" item, and the digital wallet address in the "D-4" item are uni-directionally encrypted and registered.

Data specification_2 is an identity_information_providing_data specification and is shown in Table 3 as a data specification when a user directly provides identity information to an OFF-CHAIN.

The user may change only the digital wallet address among the identity information and provide them.

TABLE 3

| Item | Necessary/Optional | Value |
| --- | --- | --- |
| D-0 | | RESERVED |
| D-1 | Necessary | Country code |
| D-2 | Necessary | Name |
| D-3 | Necessary | Certificate |
| D-4 | Necessary | Digital wallet address |
| D-5 | | RESERVED |
| D-6 | | RESERVED |
| D-7 | | RESERVED |

Referring to Table 3, when a user provides identity information to the OFF-CHAIN, it is required to provide a country code in the "D-1" item, the a user name in "D-2" item, user's certificate in the "D-3" item, and a digital wallet address the "D-4" item as necessary items and other items are set as reserved item The data specification_3 is shown in Table 4 as the data specification in the case of being registered to the ON-CHAIN as the identity information_storage_data specification.

TABLE 4

| Item | Encryption | Value |
| --- | --- | --- |
| D-0 | | User number |
| D-1 | Uni-direction | Country code |
| D-2 | Uni-direction | Name |
| D-3 | | RESERVED |
| D-4 | Uni-direction | Digital wallet address |
| D-5 | | VASP |
| D-6 | | RESERVED |
| D-7 | | Validation |

Referring to Table 4, when providing identity information to the ON-CHAIN, identity information are written with respect to setting items, such as a user unique number in the "D-0" item, a country code in the "D-1" item, a user name in the "D-2" item, a digital wallet address in the "D-4" item, a virtual asset service provider in the "D-5" item, an identity management service provider in the "D-6" item, and validation in the "D-7" item, and the like, as necessary items.

In this case, a country code in the "D-1" item for, a user name in the "D-2" item, a digital wallet address in the item "D-4" are subjected to uni-directional encryption to form de-identified identification information.

Data specification_4 is illustrated in Table 5 as the data specification when being registered to the OFF-CHAIN as identity information_storage_data specification

TABLE 5

| Item | Encryption | Value |
| --- | --- | --- |
| D-0 | | User number |
| D-1 | Bi-direction | Country code |
| D-2 | Bi-direction | Name |
| D-3 | Bi-direction | Certificate |
| D-4 | Bi-direction | Digital wallet address |
| D-5 | | VASP |
| D-6 | | IMSP |
| D-7 | | Validation |

Referring to Table 5, when identity information is stored to the OFF-CHAIN, identity information are written with respect to setting items, such as a user unique number in the "D-0" item, a country code in the "D-1" item, a user name in the "D-2" item, user's certificate in the "D-3" item, a digital wallet address in the "D-4" item, a virtual asset service provider in the "D-5" item, an identity management service provider in the "D-6" item, and validation in the "D-7" item, and the like, as necessary items.

In this case, a country code in the "D-1" item, a user name in the "D-2" item, user's certificate in the "D-3" item, a digital wallet address in the "D-4" item are bi-directionally encrypted to constitute the identity information.

Data specification_5 is an identify verification_request_data specification and is shown in Table 6 as a data specification when being requested to the ON-CHAIN by another platform.

TABLE 6

| Item | Necessary/Optional | Value |
|---|---|---|
| D-0 | Optional | User number |
| D-1 | Necessary | Country code |
| D-2 | Necessary | Name |
| D-3 | | RESERVED |
| D-4 | Necessary | Digital wallet address |
| D-5 | Optional | VASP |
| D-6 | | RESERVED |
| D-7 | | RESERVED |

Referring to Table 6, when receiving a request for verification of the user identity from another platform, identity information is written and requested with respect to setting items such as a country code in the "D-1" item, a user name in the "D-2" item, and a digital wallet address in the "D-4" item. User's unique number in the "D-0" item and the virtual asset service provider in the "D-5" item are set as optional items, and other items are reserved.

Data specification_6 is an identification_result providing_data_specification, which is illustrated in Table 7 as a data specification transmitted from ON-CHAIN to another platform.

TABLE 7

| Item | Necessary/Optional | Value |
|---|---|---|
| D-0 | Optional | User number |
| D-1 | Necessary | Country code |
| D-2 | Necessary | Name |
| D-3 | | RESERVED |
| D-4 | Necessary | Digital wallet address |
| D-5 | Optional | VASP |
| D-6 | | RESERVED |
| D-7 | Necessary | Validation |

Table 7 corresponds to a case where a result of the verification is transmitted from the ON-CHAIN to the other platform when the other platform requested the ON-chain to verify the identity of the user, wherein setting items such as a country code in the "D-1" item and a user name in the "D-2" item, a digital wallet address in the "D-4" item and the validation of the "D-7" item are written and transmitted, a user unique number in the "D-0" item and a virtual asset service provider in the "D-5" item are set as an optional item, and other items are reserved.

The data specification_7 is illustrated in Table 8 as identity information_delete_and_save_data specification on the ON-CHAIN.

TABLE 8

| Item | Encryption | Value |
|---|---|---|
| D-0 | | User number |
| D-1 | Uni-direction | Country code |
| D-2 | Uni-direction | Name |
| D-3 | | RESERVED |
| D-4 | Uni-direction | Digital wallet address |
| D-5 | | VASP |
| D-6 | | RESERVED |
| D-7 | | Validation |

Table 8 represents identity information_delete_and_save_data specification, wherein identity information is written and transmitted with respect to the setting items, such as a user unique number in the "D-0" item, a country code in the "D-1" item and a user name in the "D-2" item, a digital wallet address in the "D-4" item, a virtual asset service provider in the "D-5" item, and a validation in the "D-7" item.

In this case, the country code in the "D-1" item, user name in the "D-2" item, and digital wallet address in the "D-4" item are subjected to uni-directional encryption to constitute the identity information and other items are reserved.

Data specification_8 is illustrated in Table 9 as identity information_delete_and_save_data specification on the OFF-CHAIN.

TABLE 9

| Item | Encryption | Value |
|---|---|---|
| D-0 | | User number |
| D-1 | Bi-direction | RESERVED |
| D-2 | Bi-direction | RESERVED |
| D-3 | Bi-direction | RESERVED |
| D-4 | Bi-direction | RESERVED |
| D-5 | | VASP |
| D-6 | | IMSP |
| D-7 | | Validation |

Table 9 represents identity information_delete_and_save_data specification on the OFF-CHAIN, wherein identity information is written and transmitted with respect to the setting items, such as a user unique number in the "D-0" item, a virtual asset service provider in the "D-5" item, an identity management service provider in the "D-6" item, and a validation in the "D-7" item.

In this case, by permanently deleting and discarding an encryption key used to encrypt the country code in the "D-1" item, the user name in the "D-2" item, the user's certificate in the "D-3" item, and the digital wallet address in the "D-4" item, the items are set as reserved items.

Hereinafter, an embodiment of the present invention will be described with reference to the drawings.

Figure 2:
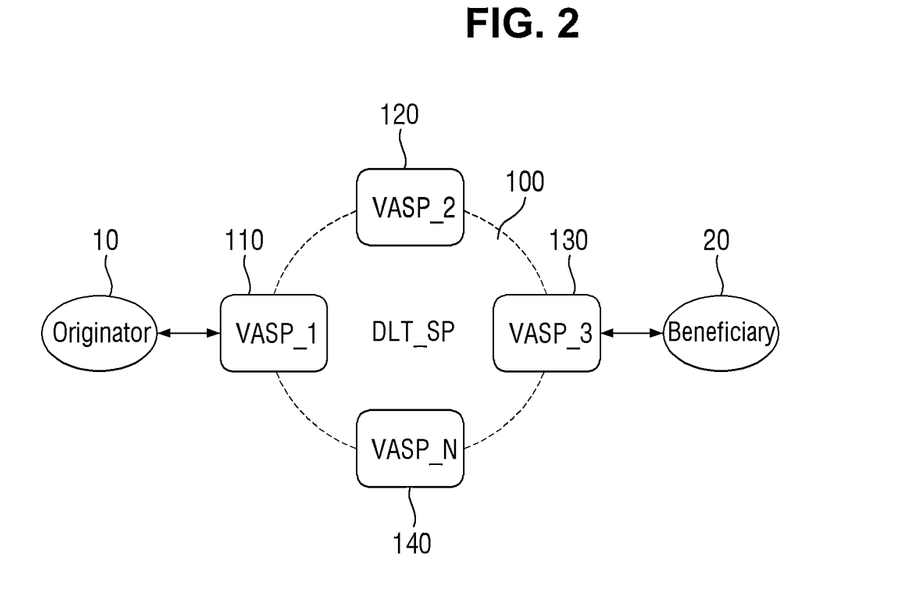
FIG. 2 is a basic conceptual diagram of a distributed ledger technology security platform for sharing de-identified identity information according to an embodiment of the present invention.

FIG. 2 is a basic conceptual diagram of a distributed ledger technology security platform for sharing de-identified identity information according to an embodiment of the present invention, and illustrates an example in which a virtual asset service provider-1 110 (hereinafter referred to as "VASP_1"), a virtual asset service provider-2 120 (hereinafter referred to as "VASP_2"), a virtual asset service provider-3 130 (hereinafter referred to as "VASP_3") and a virtual asset service provider-N 140 (hereinafter referred to as "VASP_4") are participating on an ON-CHAIN operating as a distributed ledger technology security platform, and the originator 10 of the VASP_1 110 (hereinafter referred to as "originator") is able to send virtual asset to the beneficiary 30 of the VASP_3 130 (hereinafter referred to as "beneficiary").

That is, the originator 10 is able to verify the identity of itself at the VASP_1 110, the beneficiary 20 is able to verify the identity of itself at the VASP_3 130, and therefore, in the case of remittance, the VASP_1 110 is able to receive identity information for the beneficiary 20 from the VASP_3 130 and the VASP_3 130 is able to receive identity information for the originator 10 from the VASP_1 110.

Figure 3:
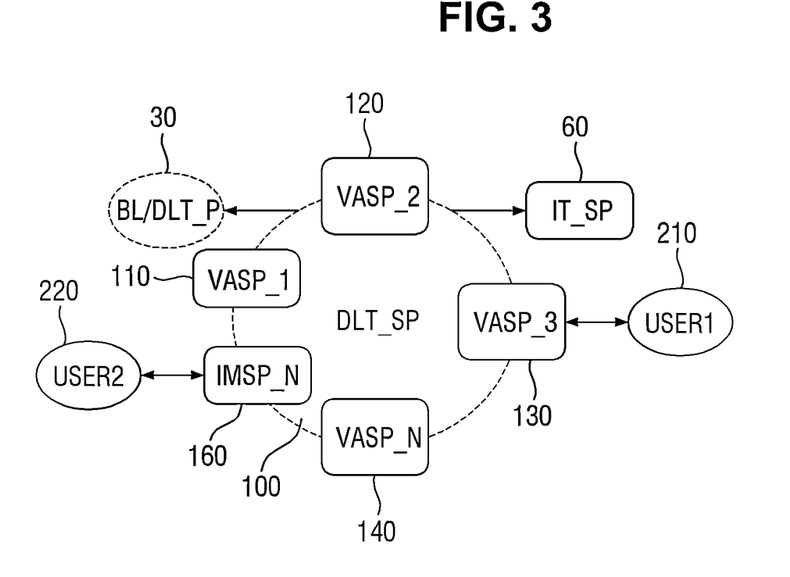
FIG. 3 is a diagram illustrating interoperability between other blockchains and a distributed ledger technology security platform of the present invention.

In addition, the distributed ledger technology security platform of the present invention may be configured to have interoperability with other blockchains.

Referring to the diagram of FIG. 3 illustrating the interoperability between other blockchains and the distributed ledger technology security platform of the present invention, it can be seen that the VASP_1 110, the VASP_2 120, the VASP_3 130 and the VASP_N 140 are participating in a distributed ledger technology security platform (hereinafter referred to as DLT_SP) 100 that operates as an ON-CHAIN and the identity management service provider-N 160 (hereinafter referred to as IMSP_N is also participating in the distributed ledger technology security platform.

Furthermore, it can be seen that, in a state where the VASP_2 120 and the VASP_N 140 are participating only in the ON-CHAIN, while the VASP_3 130 and the IMSP_N 160 are participating in both the ON-CHAIN and the OFF-CHAIN, a USER2 220 is participating in a corresponding OFF-CHAIN along with the IMSP_N 160 and is able to identify the identity of itself, and a USER1 210 is participating in a corresponding OFF-CHAIN along with the VASP_3 130 and is able to identify the identity of itself.

Other blockchains and the distributed ledger technology platform (BL/DLT_P) 30 may receive user identity information from the ON-CHAIN, and the existing IT service platform 60 may also receive user identity information from the ON-CHAIN.

Therefore, registration/change/deletion/sharing of user identity information are simultaneously possible in both the ON-CHAIN and the OFF-CHAIN.

Figure 4:
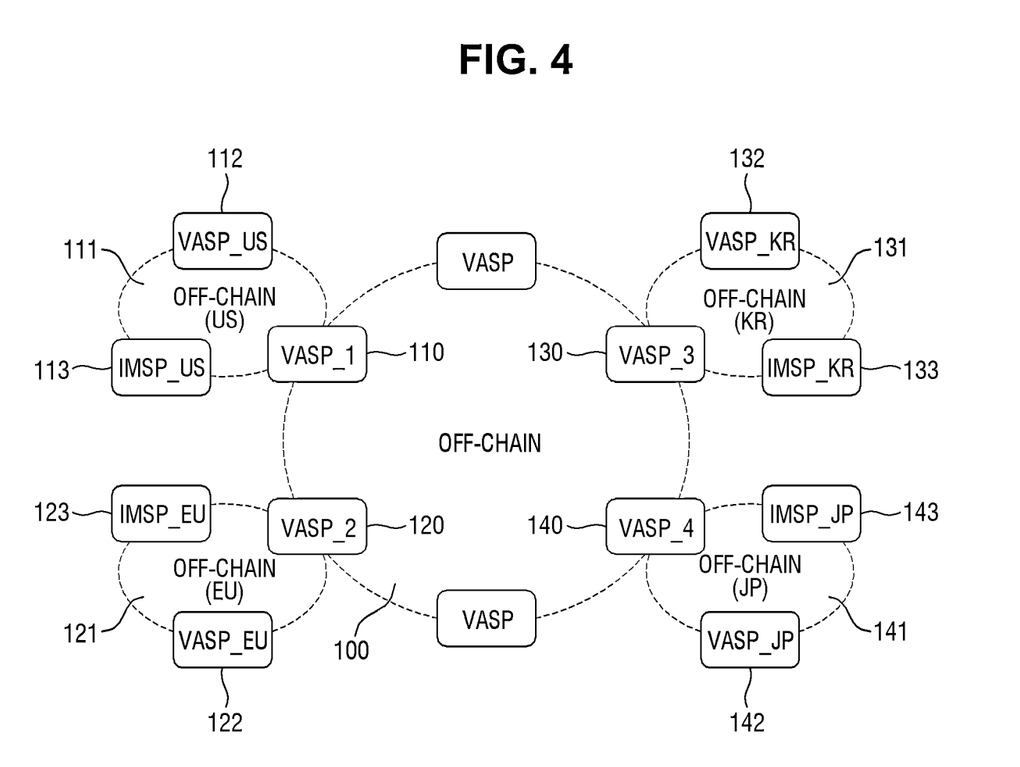
FIG. 4 is a diagram illustrating a specific configuration of an OFF-CHAIN for a relevant jurisdiction of a virtual asset service provider participating in an ON-chain.

The VASP simultaneously participating in the ON-CHAIN and the OFF-CHAIN will be described with reference to the drawings illustrating the specific configuration of the OFF-CHAIN for each jurisdiction of the VASP participating in the ON-CHAIN of FIG. 4.

In the drawing, the VASP, which participates only in the ON-CHAIN and does not form an OFF-CHAIN, has only information to be shared, which means that there is no information to be provided.

There is also the potential to form interoperability with other blockchains whenever necessary.

Referring to the drawing, it is shown that the VASPs participating in the ON-CHAIN and the OFF-CHAIN simultaneously form an OFF-CHAIN through the United States, Europe, Korea, and Japan, but the OFF-CHAIN means that the registration, change and deletion of user identity information are possible only within a single jurisdiction, and the ON-chain means that user identity information is shared among VASPs of all countries.

Specifically, the VASP_1 110 forms the OFF-CHAIN of the jurisdiction of US while participating in the ON-chain, which may represent that one or more VASP_US 112 and one or more IMSP_US 113 are participating in the OFF-CHAIN of US (OFF-CHAIN_US).

In addition, the VASP_2 120 forms the OFF-CHAIN of the jurisdiction of EU while participating in the ON-chain, which may represent that one or more VASP_EU 122 and one or more IMSP EU 123 are participating in the OFF-CHAIN of EU (OFF-CHAIN_EU).

In addition, the VASP_3 130 forms the OFF-CHAIN of the jurisdiction of KR while participating in the ON-chain, which may represent that one or more VASP_KR 132 and one or more IMSP_KR 133 are participating in the OFF-CHAIN of KR (OFF-CHAIN KR).

In addition, the VASP_4 140 forms the OFF-CHAIN of the jurisdiction of JP while participating in the ON-chain, which may represent that one or more VASP_JP 142 and one or more IMSP JP 143 are participating in the OFF-CHAIN of JP (OFF-CHAIN_JP).

In other words, the OFF-CHAIN operating as regional or national blockchains within the single jurisdiction, in which one or more virtual asset service providers (VASPs) and one or more identity management service providers participate, and ON-CHAIN operating as a global blockchain without borders, in which one or more virtual asset service providers participate, are configured, and de-identified identity information is shared among virtual asset service providers participating in the ON-chain in the distributed ledger technology security platform by storing and synchronizing a part of the user identity information stored in the OFF-CHAIN in and with the ON-CHAIN.

Figure 5:
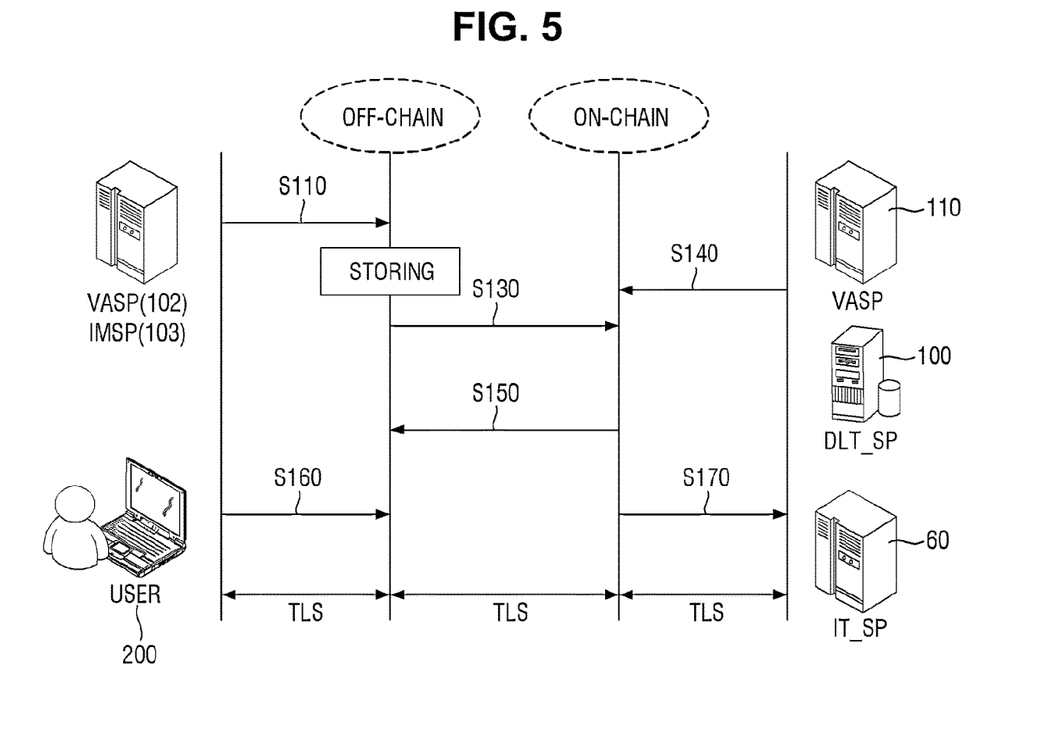
FIG. 5 is a diagram for describing a process of registering/changing/deleting and using user identity information of the present invention.

Hereinafter, a process of registering, changing, and deleting data or the like and verifying identity information using the ON-CHAIN and the OFF-CHAIN in the distributed ledger technology security platform will be described.

The VASP 102 and the IMSP 103 participating in the OFF-CHAIN provide the OFF-CHAIN with "data specification_1" which is the identity information providing_data_specification in registering, changing and deleting user identity information (S110).

The "data specification_1" provided to the OFF-CHAIN in step S110 provides the corresponding OFF-CHAIN with identity information including the user's country code and name, user's certificate, a digital wallet address, a virtual asset service provider, an identity management service provider, and validation of user identity.

When registering and changing user identity information, "data specification_1" may verify the authenticity of a certificate issuer by validation of the user certificate in the "D-3" item and validation in the "D-7" item.

When the VASP 102 and the IMSP 103 provide the user identity information to the OFF-CHAIN as "data specification_1" in step S110, the OFF-CHAIN may register the provided identity information in the OFF-CHAIN as "data specification_4" which is the identity information storage data specification (S120).

"Data specification_4" in step S120 may store the identity information including the user number, country code, name, certificate, digital wallet address, virtual asset service provider, identity management service provider and validation in the OFF-CHAIN.

Meanwhile, the "data specification_4" is a data specification used in in registering and changing user identity information when the user identity information is stored in the OFF-CHAIN.

On the other hand, the deletion of the user identity information on the OFF-CHAIN is performed by deleting a country code, a name, a certificate, and a digital wallet address of a user, setting a user's validation to not available (N/A), and deleting the identity information including a user number, an asset service provider and an identity management service provider by "data specification_8", which is identity information_delete_and_save_data specification.

This is to implement the deletion of personal information and important data by destroying the encryption key used to encrypt the user's country code, name, certificate and digital wallet address due to the characteristics of distributed ledger technology.

In addition, in a case where the USER 200 requests the OFF-CHAIN to change the user identity information because the USER 200 cannot directly register new identity information (S160), when the identity information is provided to the OFF-CHAIN as the "data specification_2" that is identity information providing data specification including the user's country code and name, the user's certificate, and the digital wallet address, as described above, the OFF-CHAIN changes the user identity information in accordance with the "data specification_4" that is identity information storage data specification, including a user number, a country code, a name, a certificate, a digital wallet address, a virtual asset service provider, an identity management service providers and validation.

Data transmission intervals among the USER, the IMSP, and the VASP and the OFF-CHAIN are subject to encryption (e.g., TLS).

As described above, when the user identity information is registered or changed by the VASP 102, the IMSP 103, or the USER 200 and stored on the OFF-CHAIN, the OFF-CHAIN share the registered or changed user identity information by synchronizing with the ON-CHAIN based on the "data specification_3" which is the identity information storage data specification including the user number, the country code, the name, and the electronic wallet address (S130).

In addition, when the user identity information is deleted by the VASP 102 or the IMSP 103 and stored on the OFF-CHAIN, the OFF-CHAIN stores the deleted user identity information by synchronizing with the ON-CHAIN according to "data specification_7" that is an identity information_delete_and_save_data specification including a user number, a country code, a name, and a digital wallet address, a virtual asset service provider and validation, and in this case, the validation of the user identity is set to not available (N/A) and stored.

In other words, the deletion of identity information in the ON-CHAIN is not to delete the actual data, but to set the validation of the user's identity to not available (N/A).

When the user identity information stored in the OFF-CHAIN in step S130 is synchronized with the ON-CHAIN, the VASP 110, the IT service platform IT SP 60, other blockchains, and the distributed ledger technology platform DLT_SP 100, which are participating in the ON-CHAIN, transmit identity verification request data (S140).

The "data specification_5" is an identity verification request data specification requesting the inquiry of user identity information including a user's country code, name, and digital wallet address from the ON-CHAIN.

In addition, the ON-CHAIN that has received for a request for inquiry of the user's identity information provides a result of the inquiry of user identity which is requested based on "data identification 6" that is an identity verification_result_providing_data_specification including a user's country code, name, digital wallet address, and user identity verification (S170).

In addition, data transmission sections between other blockchain platforms and the ON-chain are subject to encryption (e.g., TLS).

In addition, when the user identity information stored in the ON-CHAIN, which has received a request for inquiry of the user identity information, is anonymized in step S140, the ON-CHAIN additionally checks identifiable identity information through the OFF-CHAIN which has provided the identity information, and then provides a result of the inquiry of the user identity information (S150).

As described above, according to the user identity sharing system utilizing the distributed ledger technology security platform for the virtual asset service of the present invention, it is possible to achieve interoperability with other blockchain platforms and existing IT service platforms, but also data stored in ON-CHAIN can be shared by all participating nodes, and data stored in OFF-CHAIN can be shared only by participating nodes belonging to a single jurisdiction.

In addition, the distributed ledger technology security platform consisting of the ON-CHAIN and OFF-CHAIN of the present invention is a platform specialized in information protection and personal information protection, and may be a permissioned distributed ledger network consisting of the ON-CHAIN and OFF-CHAIN.

While the invention has been described in detail with respect to the described embodiments, it will be apparent to those skilled in the art that various modifications and variations are possible within the spirit of the invention, and such modifications and variations belong to the appended claims.

INDUSTRIAL APPLICABILITY

The present invention can be used in an identity sharing system that can share user identity information by registering identity information and requesting verification of the identity information in the ON-CHAIN and the OFF-CHAIN when trading virtual assets.

The invention claimed is:

1. A user identity sharing system using a distributed ledger technology security platform comprising:
   an OFF-CHAIN configured to operate as a regional or national blockchain within a single jurisdiction, in which one or more virtual asset service providers and one or more identity management service providers are participating; and
   an ON-CHAIN configured to operate as a global blockchain with no borders, in which one or more virtual asset service providers are participating,
   wherein user identity information of the OFF-CHAIN are shared as de-identified identity information between a virtual asset service provider participating in both the OFF-CHAIN and the ON-CHAIN and another virtual asset service provider participating in the ON-CHAIN.

2. The user identity sharing system of claim 1, wherein the identity management service provider participates in the OFF-CHAIN or the virtual asset service provider simultaneously participates in both the OFF-CHAIN and the ON-chain.

3. The user identity sharing system of claim 2, wherein the virtual asset service provider or the identity management service provider, which participate in the OFF-CHAIN, registers, changes or deletes the user identity information and shares identity information with another virtual asset service provider participating in the ON-chain.

4. The user identity sharing system of claim 3, wherein, when the user identity information is registered or changed,
   the virtual asset service provider and the identity management service provider provides, to the OFF-CHAIN, "data specification_1" that is an identity information_providing_data specification including a country code and a name of a user, a user's certificate, a digital wallet address, a virtual asset service provider, an identity management service provider, and validation of the user's identity, and the OFF-CHAIN registers and changes user identity information according to "data specification_4" that is identity information_storage_data specification including a user number, a country code, a name, a certificate, a digital wallet address, a virtual asset service provider, an identity management service provider, and validation.

5. The user identity sharing system of claim 3, wherein, when the user changes the user identity information,
   the user provides, to the OFF-CHAIN, "data specification_2" that is an identity information_providing_data specification including a country code and a name of the user, a user's certificate, and a digital wallet address, and the OFF-CHAIN changes user identity information according to "data specification_4" that is identity information_storage_data specification including a user number, a country code, a name, a certificate, a digital wallet address, a virtual asset service provider, an identity management service provider, and validation.

6. The user identity sharing system of claim 3, wherein the OFF-CHAIN shares the user identity information by synchronizing with the ON-chain based on "data specification_3" that is identity information_storage_data specification including a user number, a country code, a name, and a digital wallet address.

7. The user identity sharing system of claim 3, wherein when the virtual asset service provider or the identity management service provider requests the OFF-CHAIN to delete user identity information based on "data specification_1" that is identity information_providing_data specification, the OFF-CHAIN deletes the user identity information.

8. The user identity sharing system of claim 7, wherein when the virtual asset service provider or the identity management service provider participating in the OFF-CHAIN requests deletion of user identity information, the user identity information is deleted according to "data specification_8" that is identity information_storage_data specification including a user number, a country code, a name, and a digital wallet address.

9. The user identity sharing system of claim 8, wherein the deletion of user identity information on the ON-chain enables the OFF-CHAIN to share the user identity information by synchronizing with the ON-chain based on "data specification_7" that is identity information_storage_data specification including a user number, a country code, a name, a certificate, a digital wallet address, a virtual asset service provider, an identity management service provider, and the validation.

10. The user identity sharing system of claim 9, wherein the deletion of user identity information on the ON-CHAIN and the OFF-CHAIN sets the validation of the data specification as not available (N/A) and save.

11. The user identity sharing system of claim 10, wherein the deletion of a country code and a name of the user, a certificate, and a digital wallet address is performed by destroying an encryption key used to encrypt the country code and the name of the user, the certificate, and the digital wallet address.

12. The user identity sharing system of claim 2, wherein the virtual asset service provider, an IT service platform, and other blockchains and a distributed ledger technology platform which participate in the ON-CHAIN requests the ON-chain to inquire the user identity information based on "data specification_5" that is identity verification_request_data specification including the a country code and a name of a user, a certificate, and a digital wallet address, and the ON-chain provides a result of the requested inquiry of the user identity based on data specification_6" that is identity verification_result_providing_data_specification including a country code and a name of a user, a digital wallet address, and validation of the user identity.

13. The user identity sharing system of claim 12, wherein when the user identity information registered in the ON-CHAIN, which has received a request for inquiry of the user identity information, is anonymized, the ON-CHAIN additionally checks identifiable identity information through the OFF-CHAIN which has provided the identity information, and then provides a result of the inquiry of the user identity information.

* * * * *